United States Patent
Fujimoto et al.

(10) Patent No.: US 10,259,581 B2
(45) Date of Patent: Apr. 16, 2019

(54) MONITOR DEVICE HAVING A CONNECTING SURFACE TILTED DOWNWARD

(71) Applicant: Panasonic Intellectual Property Management Co., Ltd., Osaka (JP)

(72) Inventors: Masashi Fujimoto, Osaka (JP); Kaname Tomita, Osaka (JP); Mitsuhiro Tosa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/426,151

(22) Filed: Feb. 7, 2017

(65) Prior Publication Data
US 2017/0290176 A1 Oct. 5, 2017

Related U.S. Application Data

(60) Provisional application No. 62/317,635, filed on Apr. 4, 2016.

(30) Foreign Application Priority Data

Jan. 20, 2017 (JP) ................................ 2017-008501

(51) Int. Cl.
*B64D 11/00* (2006.01)

(52) U.S. Cl.
CPC .............................. *B64D 11/00151* (2014.12)

(58) Field of Classification Search
CPC ..................... B64D 11/00; B64D 11/0015
See application file for complete search history.

(56) References Cited

U.S. PATENT DOCUMENTS

| | | | |
|---|---|---|---|
| 6,409,242 B1* | 6/2002 | Chang | B60R 11/0235 296/37.7 |
| D551,197 S * | 9/2007 | Vitito | D14/129 |
| 8,070,224 B2* | 12/2011 | Vitito | B60R 11/02 296/24.34 |
| D753,077 S * | 4/2016 | Margis | D14/126 |
| D773,423 S * | 12/2016 | Margis | D14/126 |
| D812,026 S * | 3/2018 | Margis | D14/126 |
| 2011/0164053 A1* | 7/2011 | Nakamura | G01C 21/3664 345/629 |
| 2011/0174926 A1* | 7/2011 | Margis | B60N 2/4876 244/118.6 |
| 2015/0131226 A1* | 5/2015 | Tranchina | B60R 11/0252 361/679.55 |

FOREIGN PATENT DOCUMENTS

| | | |
|---|---|---|
| JP | 2013-506596 | 2/2013 |
| WO | 2011/041760 | 4/2011 |

* cited by examiner

*Primary Examiner* — James Wu
(74) *Attorney, Agent, or Firm* — McDermott Will & Emery LLP

(57) ABSTRACT

A monitor device including: a display section having a display surface; an operation section disposed at a bottom of the display section and having an operation surface substantially parallel to the display surface; a connecting section disposed at a lateral side of the operation section and having a connecting surface tilted downward relative to the display surface; and a surface switching section that connects the operation surface and the connecting surface to each other, and a normal of the display surface and a normal of the connecting surface form an acute angle.

16 Claims, 8 Drawing Sheets

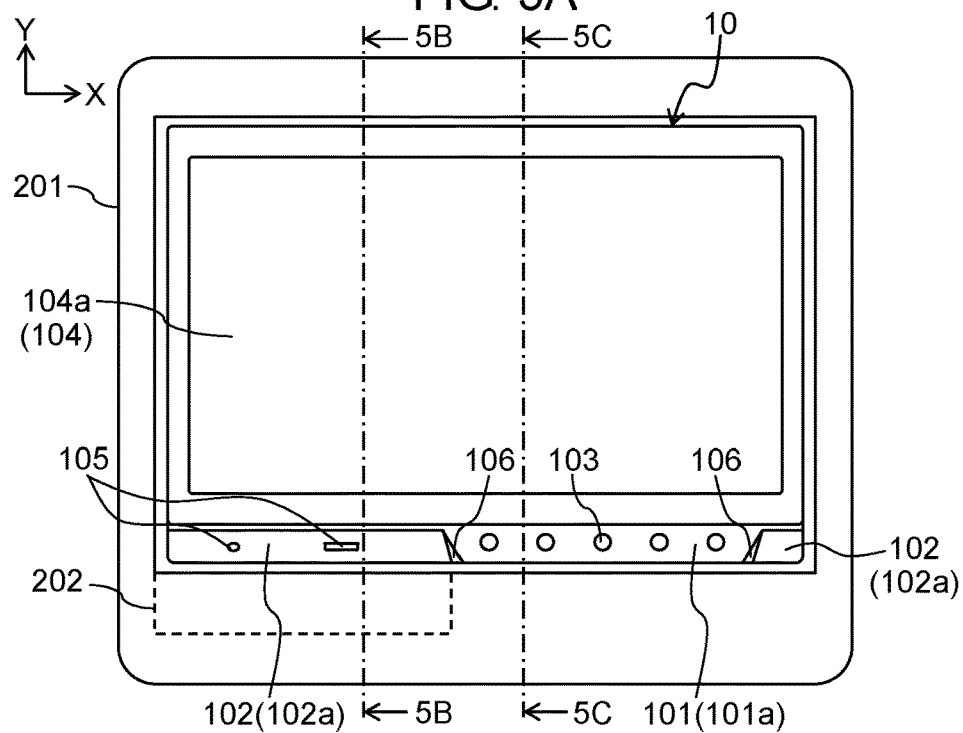
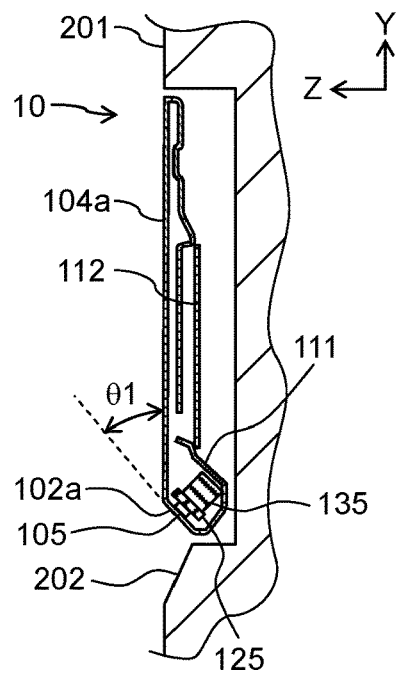
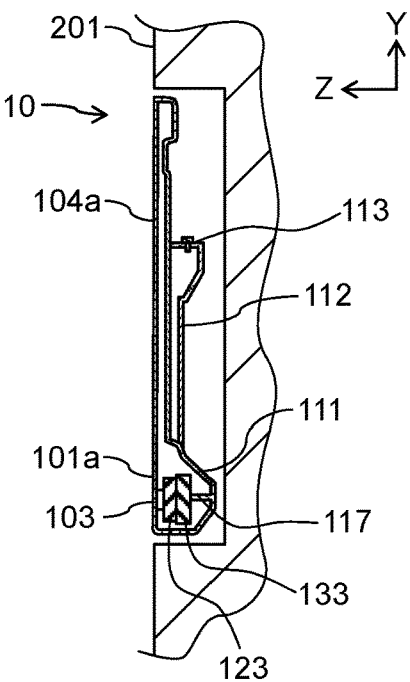

MONITOR DEVICE HAVING A CONNECTING SURFACE TILTED DOWNWARD

BACKGROUND

1. Technical Field

The present disclosure relates to monitor devices.

2. Description of the Related Art

A typical monitor device disposed on the back of a seat in, for example, an aircraft is shaped to have an operation section on a surface parallel to a display surface or on a surface tilted relative to the display surface. In such a typical monitor device, however, an interface (terminal) such as a universal serial bus (USB) or an audio jack is provided on a surface parallel to a display surface, and while a cable of external equipment is connected to the interface, the interface or a cable of the monitor device might be damaged if a passenger contacts the projected cable when passing by the seat. In a case where an operation section is provided on a tilted surface, there arises a problem of difficulty in operating the operation section by a passenger.

Patent Literature 1 discloses a system component in which a port panel region and a face panel form a predetermined panel angle.

CITATION LIST

Patent Literature

PTL 1: WO 2011/041760

SUMMARY

The present disclosure provides a monitor device that can ease an operation of an operation section and connection of cables and the like (hereinafter referred to as cables) to a connecting section such as a terminal and can also suppress damage of cables connected to the connecting section.

A monitor device according to the present disclosure includes: a display section having a display surface; an operation section disposed at a bottom of the display section and having an operation surface substantially parallel to the display surface; a connecting section disposed at a lateral side of the operation section and having a connecting surface tilted downward relative to the display surface; and a surface switching section that connects the operation surface and the connecting surface to each other, and a normal of the display surface and a normal of the connecting surface form an acute angle.

The monitor device according to the present disclosure can ease an operation of the operation section and connection of cables to the connecting section, and can also suppress damage of the cables connected to the connecting section.

BRIEF DESCRIPTION OF DRAWINGS

FIG. 5A illustrates a state in which the monitor device according to the first exemplary embodiment is installed on the back of a backrest of a seat.

FIG. 5B is a cross-sectional view taken along line 5B-5B in FIG. 5A.

FIG. 5C is a cross-sectional view taken along line 5C-5C in FIG. 5A.

DETAILED DESCRIPTION OF PREFERRED EMBODIMENTS

Exemplary embodiments of the present disclosure will be specifically described with reference to the drawings as necessary. Unnecessarily detailed description may be omitted. For example, well-known techniques may not be described in detail, and substantially identical configurations may not be repeatedly described. This is for the purpose of avoiding unnecessarily redundant description to ease the understanding of those skilled in the art.

Inventors of the present disclosure provide the attached drawings and the following description to enable those skilled in the art to fully understand the disclosure and do not intend to limit the subject matter recited in the claims based on the drawings and the description.

First Exemplary Embodiment

Figure 1:
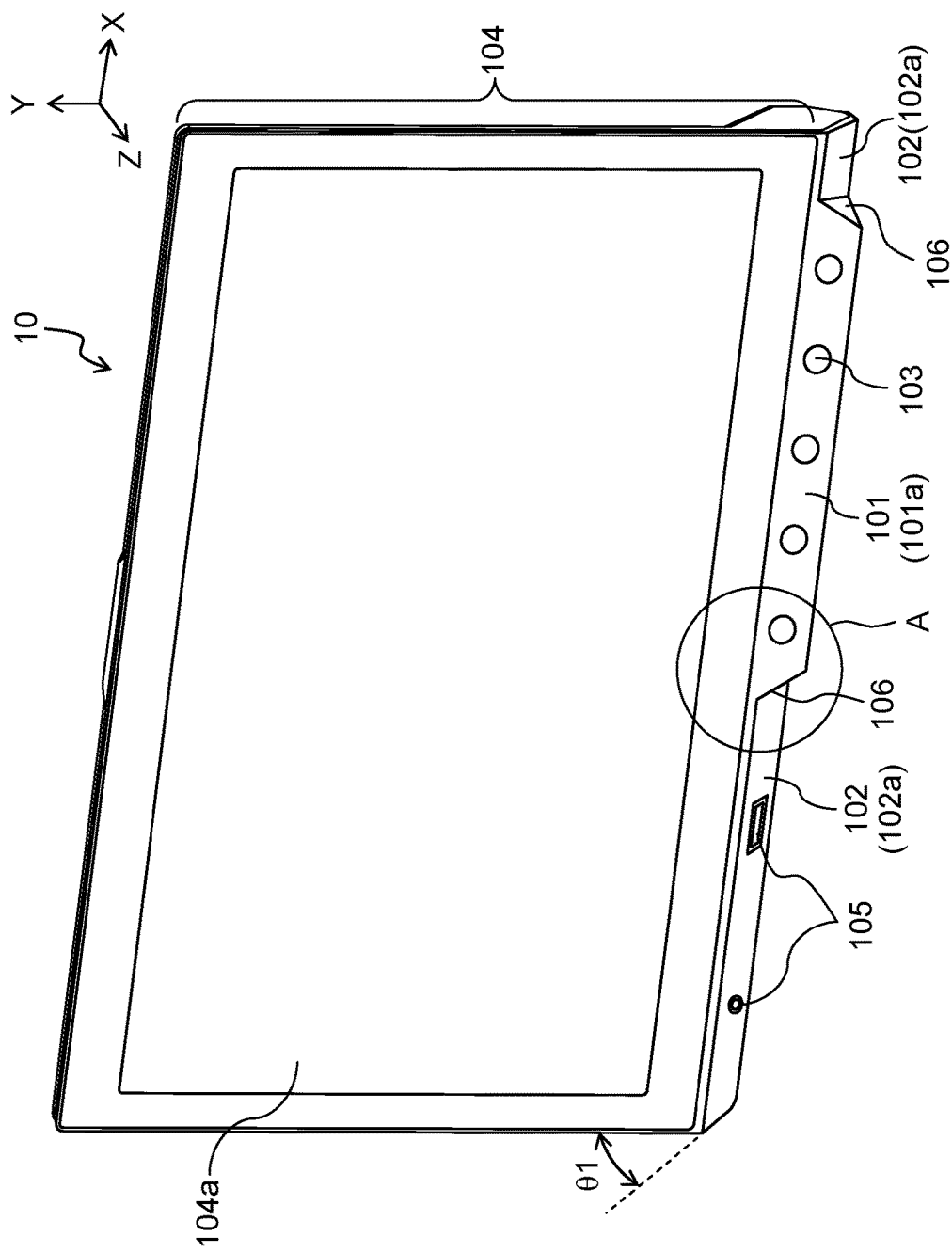
FIG. 1 is a front perspective view of a monitor device according to a first exemplary embodiment.
Figure 2:
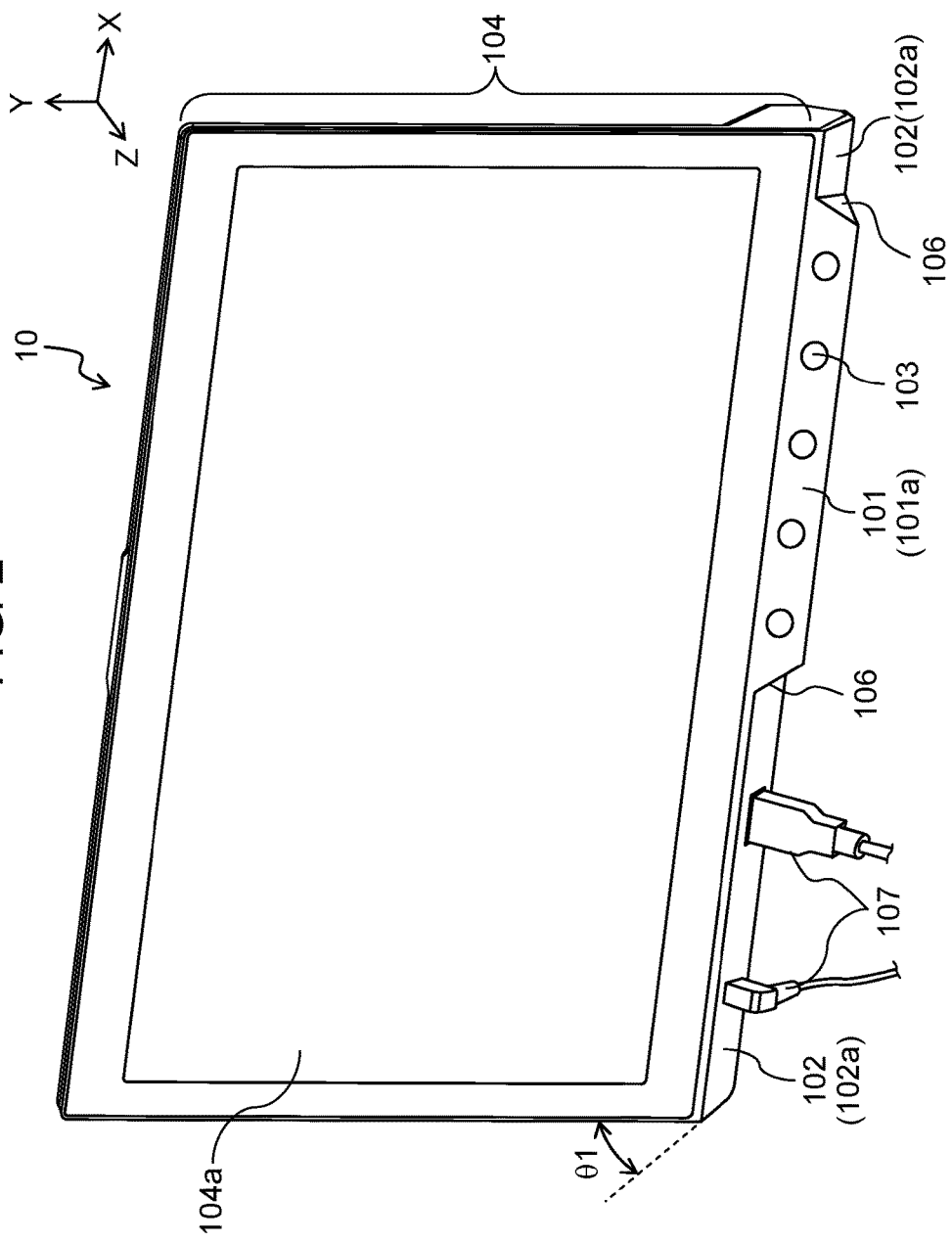
FIG. 2 schematically illustrates a state in which cables are connected to the monitor device illustrated in FIG. 1.

FIG. 1 is a front perspective view of monitor device 10 according to a first exemplary embodiment. FIG. 2 schematically illustrates a state in which cables 107 are connected to monitor device 10 illustrated in FIG. 1. Monitor device 10 is installed on the back of a backrest of a seat in, for example, an aircraft, and is buried in a recess formed in the back of the backrest. The following description uses an XYZ orthogonal coordinate system illustrated in FIGS. 1 and 2 where a +X direction represents left, a −X direction represents right, a +Y direction represents up, a −Y direction represents down, a +Z direction represents front, and a −Z direction represents back.

As illustrated in FIG. 1, monitor device 10 includes display section 104, operation section 101, and connecting sections 102. Display section 104 has a rectangular shape, and has display surface 104a parallel to an XY plane as a front surface. Display section 104 includes a monitor constituted by a known liquid crystal display or an organic EL display and a frame (bezel) of the monitor. Operation section 101 and connecting sections 102 are disposed side by side in a lateral direction at the bottom of display section 104. In monitor device 10, operation section 101 is disposed in a right portion at the bottom of display section 104, and connecting sections 102 are disposed at both lateral sides of operation section 101.

As illustrated in FIG. 1, operation section 101 includes operation surface 101a and push buttons 103, such as a power button and an attendant call button, for an operation by a user, at the front surface thereof. Operation surface 101a of operation section 101 is connected to connecting sections 102 through surface switching section 106. Operation surface 101a is constituted by a surface substantially parallel to display surface 104a of display section 104.

As illustrated in FIG. 1, connecting sections 102 include connecting surface 102a and jacks and the like (hereinafter referred to as jacks) 105 to which cables 107 (see FIG. 2) of external equipment are connected. In monitor device 10, jacks 105 are disposed in connecting section 102 located at the left of operation section 101. Connecting section 102 located at the right of operation section 101 may not be provided, and instead, operation section 101 may extend to the right end surface of display section 104.

As illustrated in FIGS. 1 and 2, connecting surfaces 102a of connecting sections 102 are tilted downward from the front at tilt angle θ1 (acute angle) relative to display surface 104a of display section 104 (i.e., operation surface 101a of operation section 101). Specifically, connecting sections 102 are configured such that a normal of each connecting surface 102a is tilted diagonally downward toward the front in a normal use state of monitor device 10 (i.e., a state in which display surface 104a is oriented substantially vertical). Monitor device 10 is configured such that an angle formed by operation surface 101a and each connecting surface 102a (display surface 104a) (tilt angle θ1) is about 45°. That is, connecting surfaces 102a are substantially parallel to a plane defined by Y=Z. To obtain advantages described later, tilt angle θ1 is preferably in the range from 15° to 75°, and more preferably in the range from 30° to 60°.

Jacks 105 are disposed on connecting surface 102a so that plugs of cables 107 inserted in jacks 105 face downward as illustrated in FIG. 2. This configuration can prevent damage of plugs of cables 107 or jacks 105 caused when a person is caught in cables 107 connected to jacks 105 while passing ahead of monitor device 10. In a normal use state, since operation surface 101a is oriented substantially vertically, it is possible to achieve both easiness in operation of push buttons 103 by a user and in inserting or removing plugs of cables 107 into/from jacks 105 and prevention of damage of jacks 105 and cables 107.

As illustrated in FIGS. 1 and 2, surface switching sections 106 are disposed near a lower center portion of monitor device 10. This layout can enhance the strength of a casing of monitor device 10 while obtaining internal space (described later) for disposing an electronic circuit board or other components at the back of operation surface 101a and connecting surfaces 102a in the casing. In addition, monitor device 10 has two surface switching sections 106 by disposing connecting sections 102 at both sides of operation section 101. Thus, the strength of the casing of monitor device 10 can be further enhanced. This is significantly effective in a seat monitor device that is disposed at the back of a seat in an aircraft where a person often passes ahead of monitor device 10.

Figure 3:
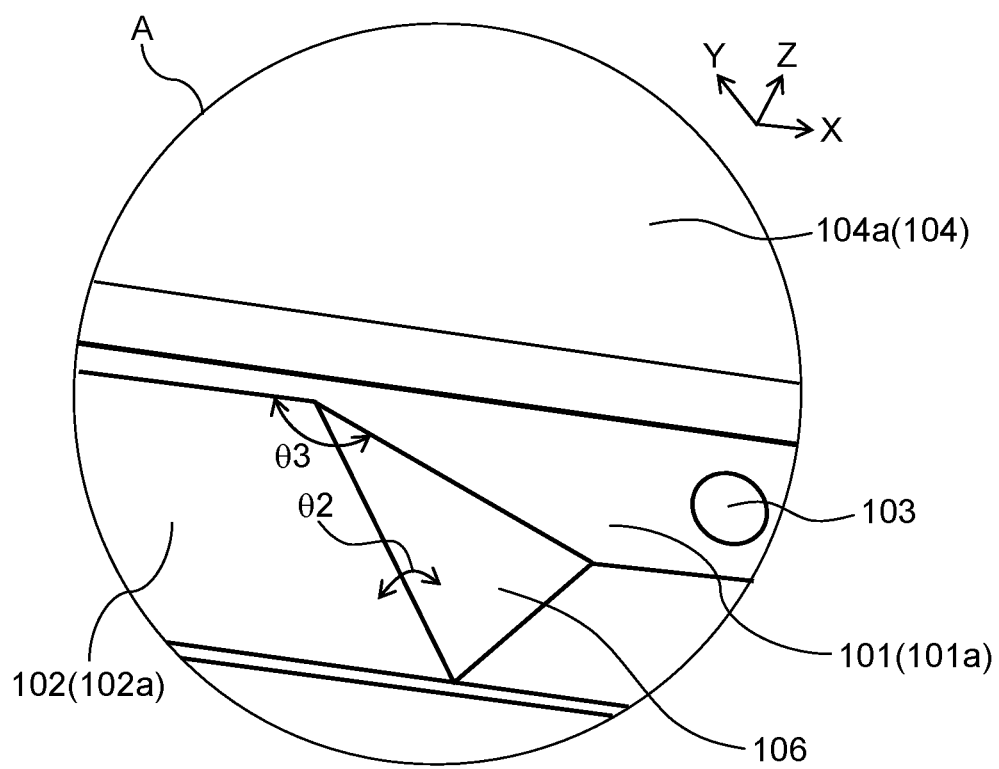
FIG. 3 is an enlarged view of a surface switching section illustrated in portion A of FIG. 1 seen from the lower left.

FIG. 3 is an enlarged view of surface switching section 106 illustrated in portion A of FIG. 1 seen from the lower left. As illustrated in FIG. 3, surface switching section 106 is constituted by a plane. Angle θ2 formed by surface switching section 106 and connecting surface 102a is about 135° (obtuse angle). Specifically, a normal of the plane constituting surface switching section 106 forms about 45° with respect to a normal of connecting surface 102a, and is tilted by about 45° in the +X direction from a surface parallel to a YZ plane. Thus, when monitor device 10 is seen from the front, surface switching section 106 can be visually recognized. This is effective for inhibiting catching of a person in operation section 101 when the person passes ahead of monitor device 10. Surface switching section 106 may be a surface perpendicular to connecting surface 102a (parallel to the YZ plane). A portion where surface switching section 106 is joined to connecting surface 102a or operation surface 101a may have an R shape or a rounded shape.

As illustrated in FIG. 3, angle θ3 formed by the upper side of connecting surface 102a of connecting section 102 and the left side of operation surface 101a of operation section 101 is about 120° (obtuse angle). That is, the upper side of connecting surface 102a and the left side of operation surface 101a are located on an XY plane, the upper side of connecting surface 102a is parallel to X, and the left side of operation surface 101a is parallel to a line (Y=−√3X). This is effective for inhibiting catching of a person in operation section 101 when the person passes ahead of monitor device 10. Angle θ3 may be about 90° (right angle). A portion where the lower side of display surface 104a is joined to surface switching section 106 may have an R shape or a rounded shape.

A side of surface switching section 106 facing operation surface 101a forms an obtuse angle with respect to the lower side of display section 104.

Surface switching section 106 may not be a plane and may be a curved surface. Two surface switching sections 106 at both sides of operation section 101 are plane symmetry.

Figure 4:
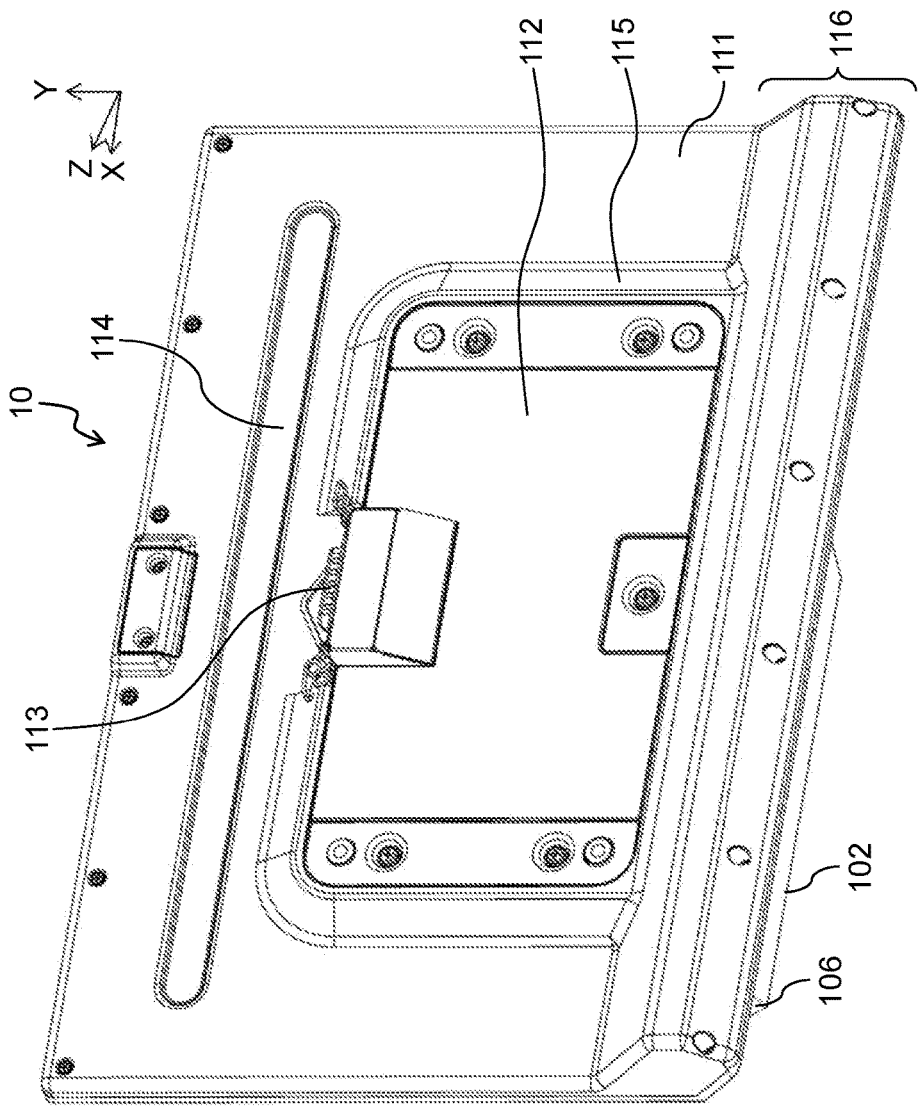
FIG. 4 is a back perspective view of the monitor device according to the first exemplary embodiment.

FIG. 4 is a back perspective view of monitor device 10 according to the first exemplary embodiment. As illustrated in FIG. 4, monitor device 10 includes frame 111 covering the back of display section 104 and serving as the casing of monitor device 10, cover 112 covering a center portion of frame 111, and connector 113 disposed at the boundary between an upper part of cover 112 and frame 111 and used for receiving a video signal from the outside.

As illustrated in FIG. 4, frame 111 includes recess 114 in an upper portion, board housing 115 in a center portion, and projection 116 in a lower portion. Recess 114 serves as a handle that is used when monitor device 10 is carried alone. Board housing 115 houses an electronic circuit board including connector 113 and is covered with cover 112. Projection 116 is internal space for housing electronic circuit boards 123 and 125 (see FIGS. 5B and 5C) for causing push buttons 103 of operation section 101 and jacks 105 of connecting section 102 to operate.

FIG. 5A illustrates a state in which monitor device 10 according to the first exemplary embodiment is installed on back 201 of a backrest of a seat. FIG. 5B is a cross-sectional view taken along lien 5B-5B in FIG. 5A. FIG. 5C is a cross-sectional view taken along line 5C-5C in FIG. 5A.

As illustrated in FIG. 5B, connecting surface 102a of connecting section 102 forms tilt angle θ1 with respect to display surface 104a of display section 104, and is tilted downward. As illustrated in FIG. 5C, operation surface 101a of operation section 101 is located on substantially the same plane as display surface 104a of display section 104. As described above, however, operation surface 101a may not be located on the same plane as display surface 104a, and may be constituted by a plane substantially parallel to display surface 104a.

Connecting surface 102a of connecting section 102 and operation surface 101a of operation section 101 are integrally formed with frame 111, as illustrated in FIG. 5B and FIG. 5C, respectively.

As illustrated in FIG. 5B, electronic circuit board 125 and cushioning material 135 are disposed in this order from connecting surface 102a in projection 116 of frame 111 corresponding to connecting section 102. Jacks 105 are electrically and mechanically connected to electronic circuit board 125. Electronic circuit board 125 is connected to a control board (not shown) disposed in monitor device 10. Cushioning material 135 is disposed at the back of electronic circuit board 125, and is interposed between electronic circuit board 125 and frame 111. Cushioning material 135 is made of, for example, a foamed material or a rubber, and can prevent damage of electronic circuit board 123 when a person contacts monitor device 10. Here, a surface of frame 111 corresponding to a portion that contacts the back of cushioning material 135 is substantially parallel to connecting surface 102a.

As illustrated in FIG. 5C, electronic circuit board 123, cushioning material 133, and rib 117 are arranged in this order from operation surface 101a in projection 116 of frame 111 corresponding to the location of operation section 101. Push buttons 103 are electrically and mechanically connected to electronic circuit board 123. Electronic circuit board 123 is connected to a control board (not shown) disposed in monitor device 10. Cushioning material 133 is disposed at the back of electronic circuit board 123, and is interposed between electronic circuit board 125 and rib 117. Cushioning material 133 is made of, for example, a foamed material or a rubber, and can prevent damage of electronic circuit board 123 when a person contacts monitor device 10. Rib 117 extends substantially perpendicularly to operation surface 101a from frame 111 toward cushioning material 133, and can hold electronic circuit board 123 through cushioning material 133.

As illustrated in FIGS. 5A and 5B, tilt part 202 is formed in a portion of back 201 of the backrest of the seat on which monitor device 10 is installed corresponding to connecting section 102. The position of tilt part 202 on monitor device 10 side and the position of connecting surface 102a on tilt part 202 side are substantially the same in the front-rear direction of monitor device 10. That is, the distance from the lower end of connecting surface 102a to the display surface 104a is substantially equal to the distance from the upper end of tilt part 202 to display surface 104a in the front-rear direction. In the case where monitor device 10 is installed on back 201 of the backrest of the seat in, for example, an aircraft as described above, tilt part 202 is disposed in a portion of back 201 of the backrest corresponding to connecting section 102 so that plugs of cables 107 can be easily inserted or removed into/from jacks 105. In terms of design, an integrated appearance of back 201 of the backrest of the seat and monitor device 10 can be obtained.

As described above, monitor device 10 is configured such that the shape of the front surface of frame 111 has an angle suitable for an application. Specifically, monitor device 10 has a first surface substantially parallel to display surface 104a in a region in a lower portion of display section 104 and a second surface at tilt angle θ1 with respect to display surface 104a in another region. The first surface serves as operation surface 101a of operation section 101 on which push buttons 103 and a slide switch to be operated by a user, for example, are disposed. The second surface serves as connecting surface 102a of connecting section 102 on which jacks 105 for connecting cables 107 of the external equipment are disposed.

In this manner, the parallel surface (first surface) and the tilted surface (second surface) suitable for an application are formed in the front surface of frame 111 of monitor device 10 so that operability and visual recognizability of a user can be enhanced and damage of cables 107 such as an interface cable connected to monitor device 10 can be prevented.

In addition, since surface switching section 106 that connects the parallel surface (first surface) and the tilted surface (second surface) to each other is disposed near a center portion in a side of display section 104 of monitor device 10, the strength of frame 111 in a collision test or other tests can be enhanced.

Second Exemplary Embodiment

Figure 6A:
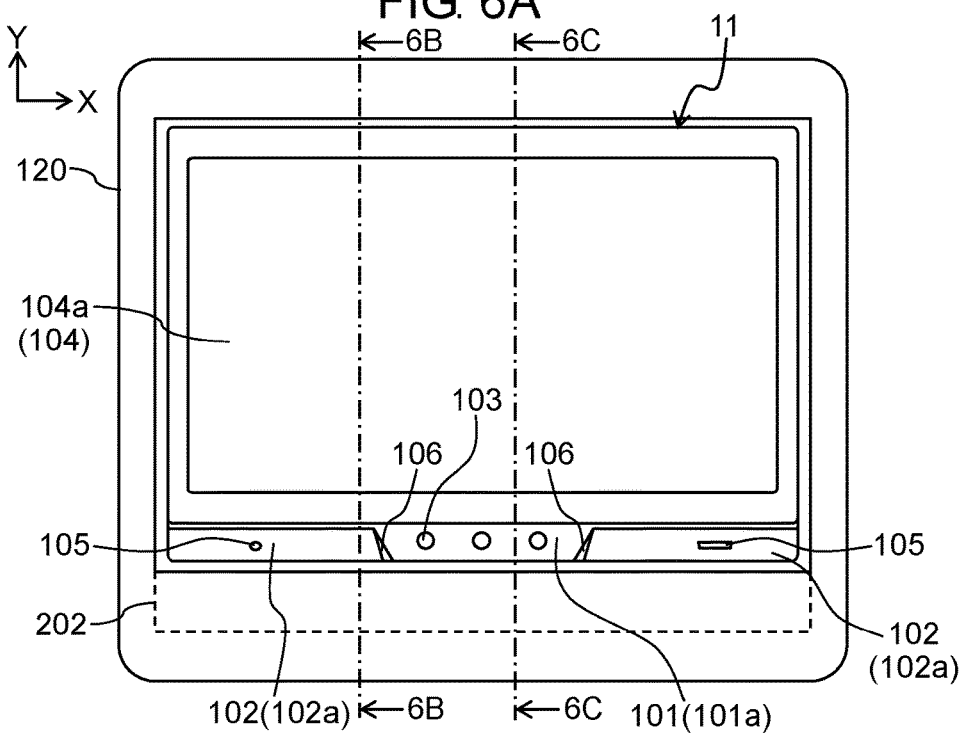
FIG. 6A illustrates a state in which a monitor device according to a second exemplary embodiment is installed on the back of a backrest of a seat.
Figure 6B:
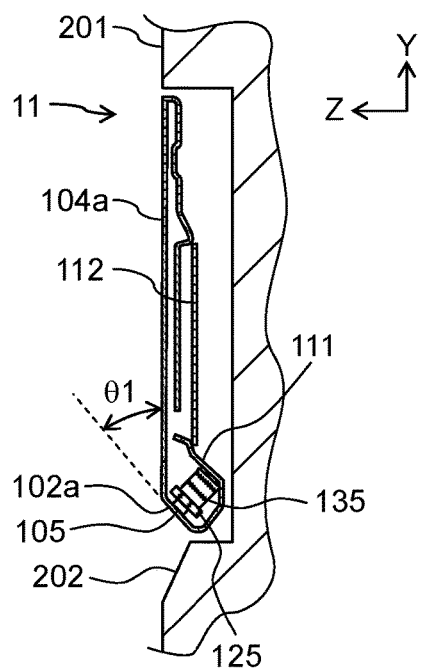
FIG. 6B is a cross-sectional view taken along line 6B-6B in FIG. 6A.
Figure 6C:
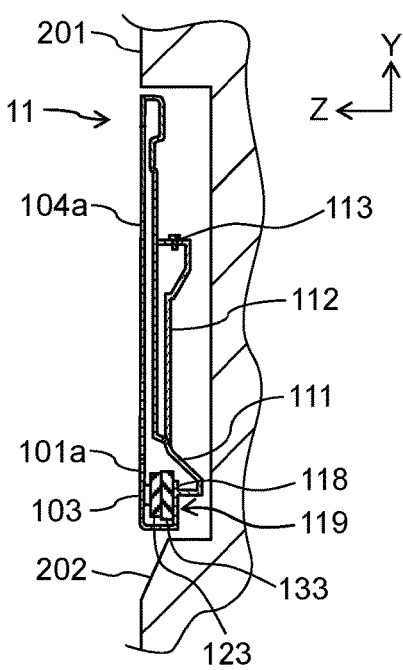
FIG. 6C is a cross-sectional view taken along line 6C-6C in FIG. 6A.

FIG. 6A illustrates a state in which monitor device 11 according to a second exemplary embodiment is installed on back 201 of a backrest of a seat. FIG. 6B is a cross-sectional view taken along line 6B-6B in FIG. 6A. FIG. 6C is a cross-sectional view taken along line 6C-6C in FIG. 6A. As illustrated in FIG. 6A, monitor device 11 includes operation section 101 and connecting sections 102 that are disposed along a lower side of display section 104. Operation section 101 is disposed in a lower center portion of monitor device 11, and connecting sections 102 are disposed at both sides of operation section 101. Connecting sections 102 are connected to operation section 101 through surface switching sections 106 of operation section 101. Two surface switching sections 106 at both sides of operation section 101 are disposed at positions that approximately equally divide the lower side of display section 104 into three parts. This configuration can enhance the strength of a casing of monitor device 11 including operation section 101 and connecting sections 102.

The 6B-6B cross-sectional view of monitor device 11 illustrated in FIG. 6B is the same as the 5B-5B cross-sectional view of monitor device 10 illustrated in FIG. 5B and described in the first exemplary embodiment. As illustrated in FIG. 6C, monitor device 11 includes notch 119 at the back of operation section 101. In frame 111, rib 118 is formed to extend upward from notch 119. Notch 119 and rib 118 are substantially parallel to operation surface 101a (display surface 104a).

As illustrated in FIG. 6C, electronic circuit board 123, cushioning material 133, and rib 117 are arranged in this order from operation surface 101a, in a portion corresponding to operation section 101 in frame 111. Push buttons 103 are electrically and mechanically connected to electronic circuit board 123. Electronic circuit board 123 is connected to a control board (not shown) disposed in monitor device 11. Cushioning material 133 is disposed at the back of electronic circuit board 123, and is interposed between electronic circuit board 125 and notch 119 and rib 118. Cushioning material 133 is made of, for example, a foamed material or a rubber, and can prevent damage of electronic circuit board 123 when a person contacts monitor device 11. Notch 119 and rib 118 can hold electronic circuit board 123 through cushioning material 133.

In this exemplary embodiment, as illustrated in FIGS. 6A and 6C, tilt part 202 formed in back 201 of a backrest of a seat is provided in a portion corresponding to both operation section 101 and connecting sections 102 disposed along the lower side of monitor device 11 (i.e., the entire lower side). As described in the first exemplary embodiment, tilt part 202 may be formed only in portions facing connecting sections 102 without being formed in a portion facing operation section 101.

A user can easily change the angle of monitor device 11 by engaging a finger with notch 119 located at the back of connecting sections 102. That is, notch 119 serves as a hook that enables a user to easily change the angle of the monitor device 11 relative to the back of the backrest of the seat on which the monitor device 11 is installed. Notch 119 may be provided at the back of operation section 101 in monitor device 10 according to the first exemplary embodiment.

Third Exemplary Embodiment

Figure 7:
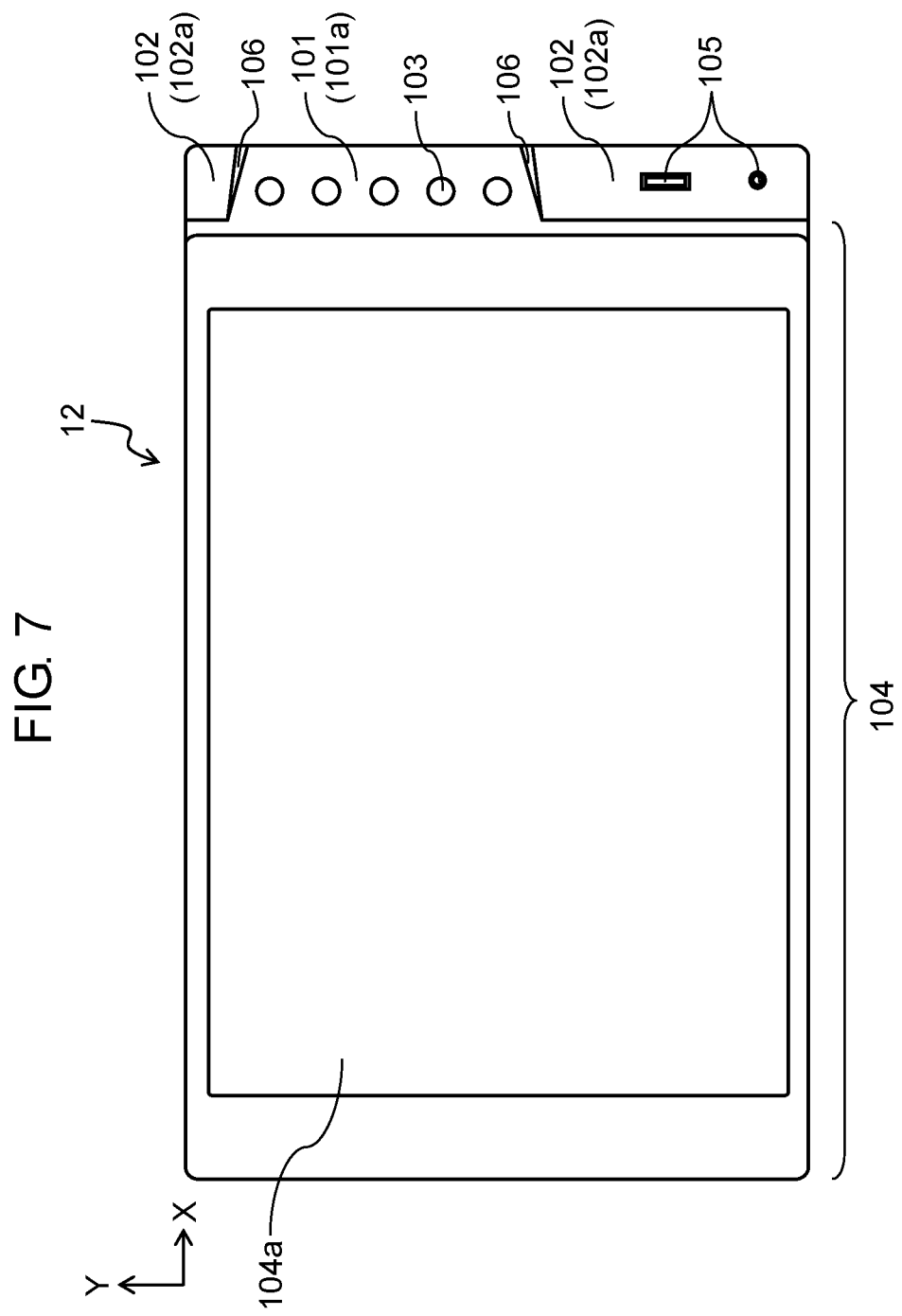
FIG. 7 schematically illustrates a monitor device according to a third exemplary embodiment.

FIG. 7 schematically illustrates monitor device 12 according to a third exemplary embodiment. As illustrated in FIG. 7, monitor device 12 includes operation section 101 and connecting sections 102 that are arranged along the right side of display section 104. Connecting section 102 is disposed below operation section 101. This configuration can obtain an advantage that cables 107 connected to jacks 105 of connecting section 102 do not inhibit an operation of operation section 101 by a user. The other part of the configuration is the same as those of monitor devices 10 and 11 according to the first and second exemplary embodiments, and will not be repeatedly described.

As described above, the locations of operation section 101 and connecting sections 102 are not limited to a lower portion of the monitor devices described in the first and second exemplary embodiments. Operation section 101 and connecting sections 102 may be arranged side by side along the right or left side of display section 104, or may be arranged side by side along the upper side of display section 104.

Other Exemplary Embodiments

In the above description, the first through third exemplary embodiments have been described as examples of a technique disclosed in this application. However, the technique disclosed here is not limited to these examples, and is applicable to other embodiments obtained by changes, replacements, additions, and/or omissions as necessary. Components described in the first through third exemplary embodiments may be combined as a new exemplary embodiment. Specifically, other exemplary embodiments will now be described.

In the first through third exemplary embodiments, push buttons 103 of operation section 101 are disposed. Alternatively, not only push buttons 103 but also a slide switch and/or a proximity sensor that is operated by an approach of a finger or an arm, for example, may be disposed. In this case, buttons or other components can be disposed at locations where the buttons or other components can be easily visually recognized and easily accessed by a user, that is, easily operated by the user.

In the first exemplary embodiment, operation section 101 is disposed in a lower right portion of monitor device 10. Alternatively, operation section 101 may be disposed in a lower left portion with connecting section 102 provided with jacks 105 being disposed in a lower right portion of monitor device 10.

Figure 8:
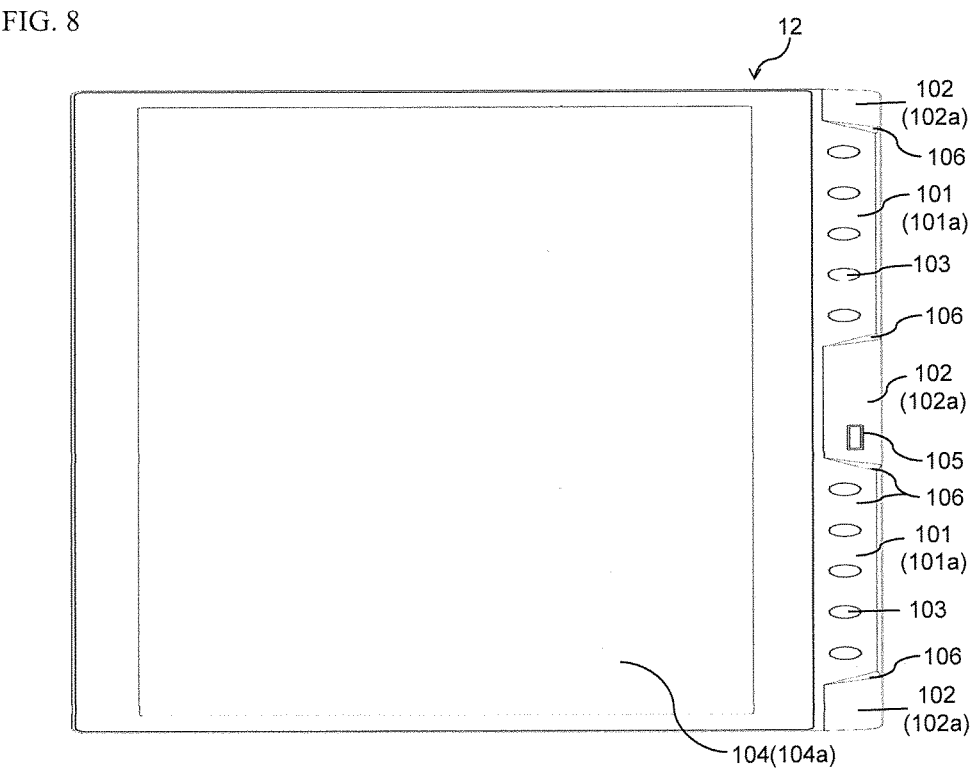
FIG. 8 schematically illustrates a monitor device according to a fourth exemplary embodiment.

In the second exemplary embodiment, operation section 101 is disposed in a lower center portion of monitor device 11 and connecting sections 102 are disposed at both sides of operation section 101. Alternatively, connecting section 102 may be disposed in a lower center portion with operation sections 101 being disposed at both sides of connecting section 102 as shown in FIG. 8. With this configuration, operation sections 101 at both sides of connecting section 102 serve as guides so that a wire position of cables 107 connected to jacks 105 of connecting section 102 is restricted, thereby reducing contact of a user with cables 107.

In the foregoing description, exemplary embodiments have been described as examples of the technique of the present disclosure. For this description, accompanying drawings and detailed description are provided.

Thus, components provided in the accompanying drawings and the detailed description can include components unnecessary for solving problems as well as components necessary for solving problems. Therefore, it should not be concluded that such unnecessary components are necessary only because these unnecessary components are included in the accompanying drawings or the detailed description.

Since the foregoing exemplary embodiments are examples of the technique of the present disclosure, various changes, replacements, additions, and/or omissions may be made within the range recited in the claims or its equivalent range.

INDUSTRIAL APPLICABILITY

The present disclosure is applicable to monitor devices, especially a monitor device that is installed in a seat in a vehicle such as an aircraft.

What is claimed is:

1. A monitor device comprising:
    a display section having a display surface;
    an operation section disposed at a bottom of the display section and having an operation surface substantially parallel to the display surface;
    a connecting section disposed at a lateral side of the operation section and having a connecting surface tilted downward relative to the display surface, the connecting section having a receptacle for receiving a connector; and
    a surface switching section that connects the operation surface and the connecting surface to each other, wherein the display surface and the operation surface are disposed on a same surface.

2. The monitor device of claim 1, wherein the surface switching section comprises a plurality of surface switching sections.

3. The monitor device of claim 2, wherein a notch is provided at a back of the operation section.

4. The monitor device of claim 3, wherein the operation section is disposed at two side surfaces of the connecting section.

5. The monitor device of claim 2, wherein the connecting surface comprises a first area including the receptacle and a second area disposed at an opposite side of the first side with respect to the operation section;
    a width of the first area in a lateral direction is longer than a width of the second area in the lateral direction.

6. The monitor device of claim 5, wherein the second area of the connecting surface does not include the receptacle.

7. The monitor device of claim 2, wherein the operation section is disposed at two side surfaces of the connecting section.

8. The monitor device of claim 1, wherein a notch is provided at a back of the operation section.

9. The monitor device of claim 8, wherein the operation section is disposed at two side surfaces of the connecting section.

10. The monitor device of claim 1, wherein the connecting surface comprises a first area including the receptacle and a second area disposed at an opposite side of the first side with respect to the operation section;
    a width of the first area in a lateral direction is longer than a width of the second area in the lateral direction.

11. The monitor device of claim 10, wherein the second area of the connecting surface does not include the receptacle.

12. The monitor device of claim 1, wherein the operation section is disposed at two side surfaces of the connecting section.

13. The monitor device of claim 1, wherein the surface switching section has a triangular-shaped surface, and the triangular-shaped surface forms a plane which is neither parallel nor perpendicular to a first plane formed by the display surface of the display section and a second plane formed by the connecting surface of the connecting section.

14. A monitor device comprising:
- a display section having a display surface;
- an operation section disposed at a bottom of the display section and having an operation surface substantially parallel to the display surface;
- a connecting section disposed at a lateral side of the operation section and having a connecting surface tilted downward relative to the display surface, the connecting section having a receptacle for receiving a connector; and
- a surface switching section that connects the operation surface and the connecting surface to each other, wherein
- a surface of the surface switching section tilts upward relative to the connecting surface in a vertical direction;
- the surface switching section faces a viewer in a case where the display surface is viewed from a front of the display surface; and
- a normal of the surface switching section is not parallel to the display surface and is not parallel to a surface being perpendicular to the display surface.

15. The monitor device of claim 14, wherein an angle between a side of the operation surface shared with the surface switching section and an upper side of the connecting surface is an obtuse angle.

16. The monitor device of claim 14, wherein the surface switching section has a triangular-shaped surface, and the triangular-shaped surface forms a plane which is neither parallel nor perpendicular to a first plane formed by the display surface of the display section and a second plane formed by the connecting surface of the connecting section.

* * * * *